E. L. OLIVER.
CONTINUOUS VACUUM FILTER.
APPLICATION FILED SEPT. 8, 1908.

919,628.

Patented Apr. 27, 1909.
4 SHEETS—SHEET 1.

WITNESSES.
Arthur L. Slee
S. Constine

INVENTOR.
Edwin Letts Oliver
by Wm. F. Booth
his Attorney.

E. L. OLIVER.
CONTINUOUS VACUUM FILTER.
APPLICATION FILED SEPT. 8, 1908.
919,628.
Patented Apr. 27, 1909.
4 SHEETS—SHEET 2.
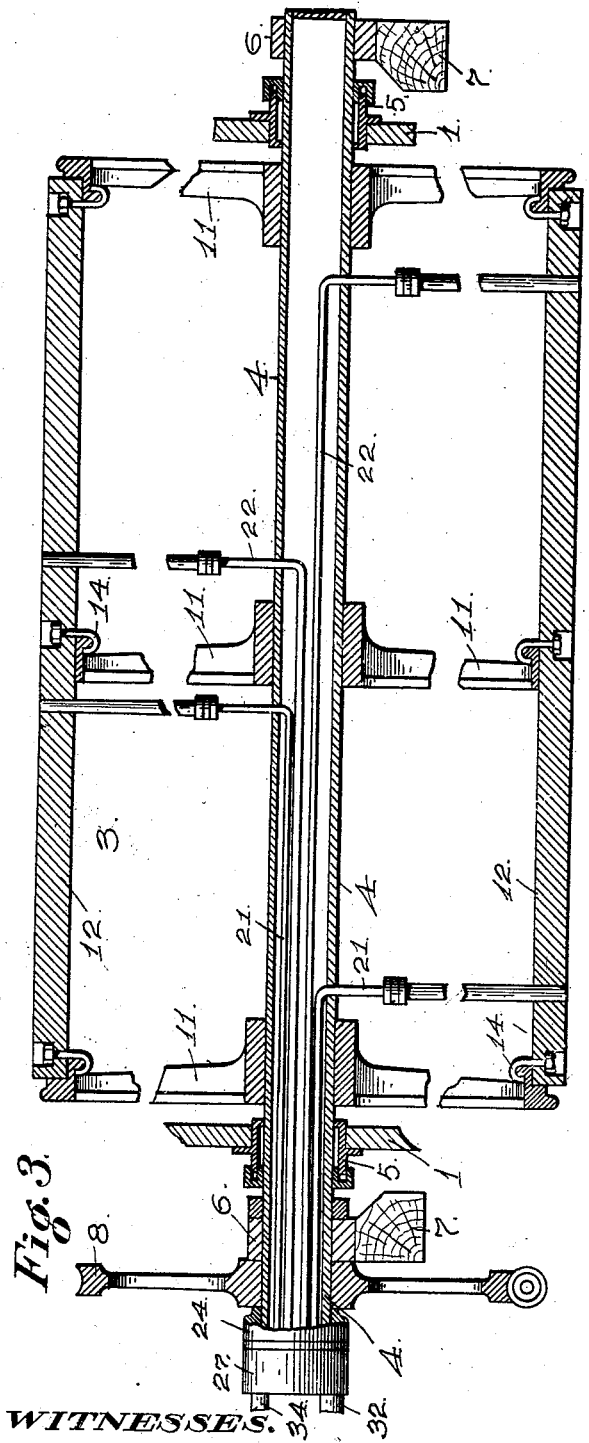
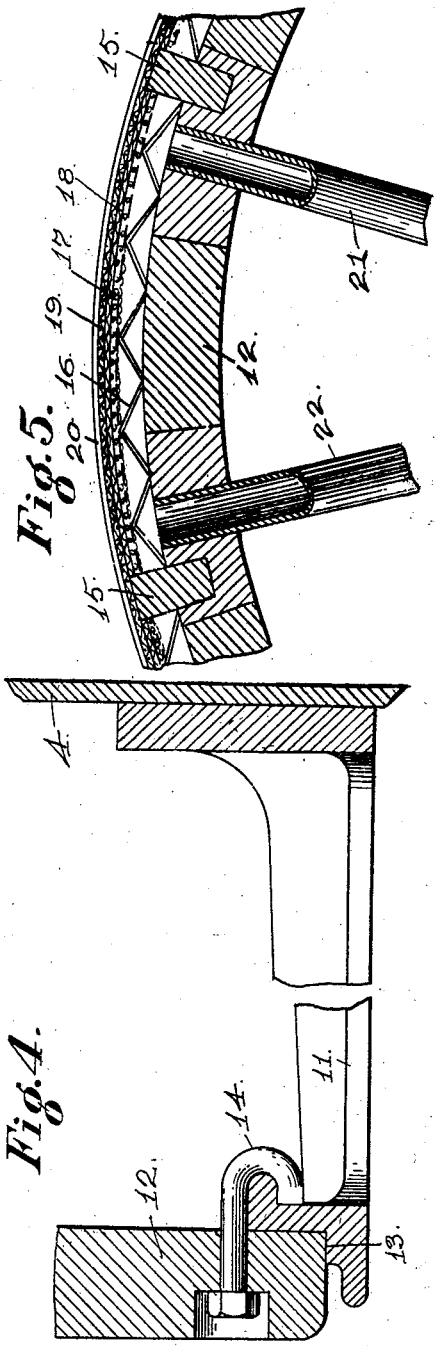
WITNESSES.
Arthur L Slee.
S. Constine.
INVENTOR.
Edwin Letts Oliver
by Wm F. Booth
his Attorney.

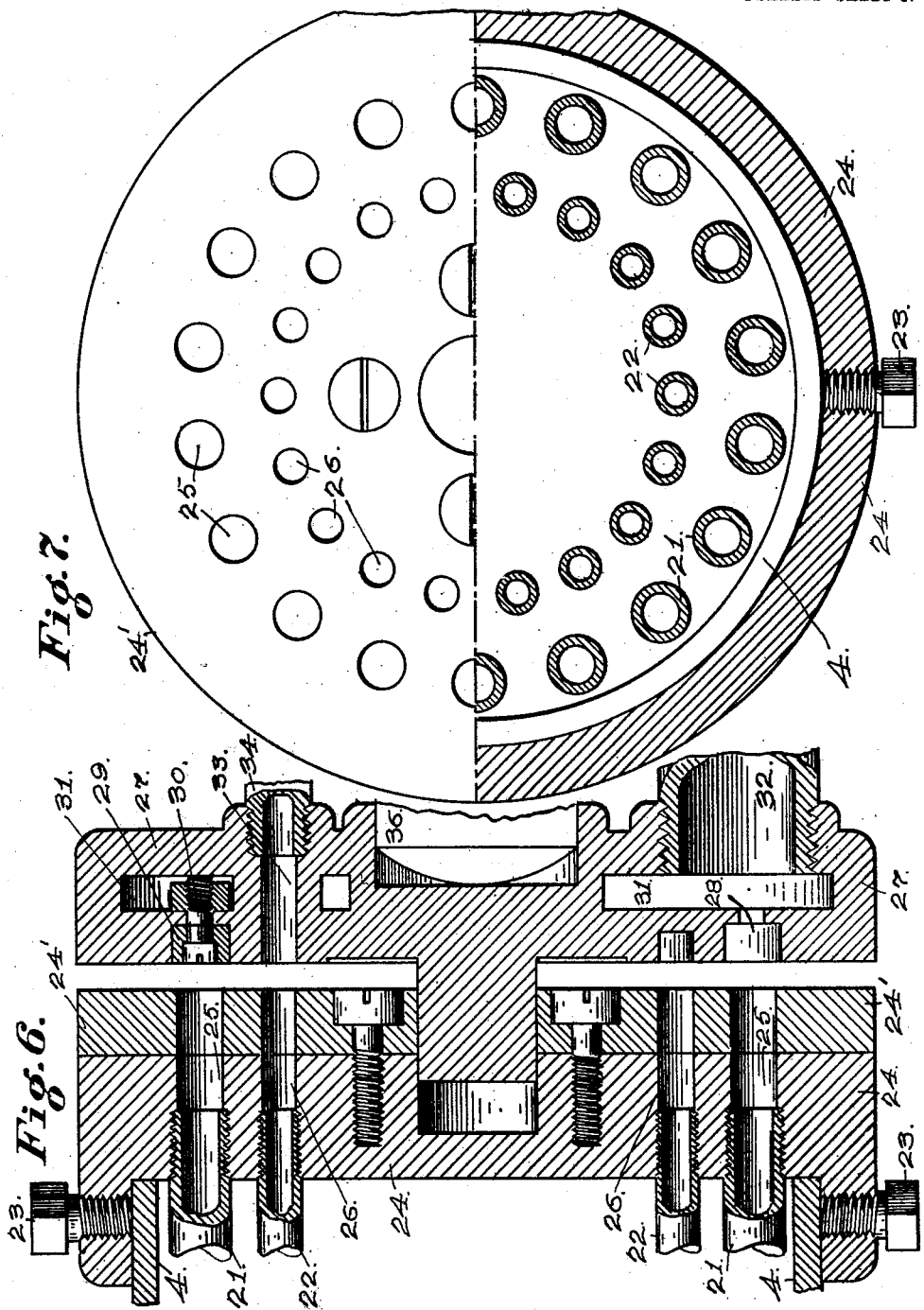

E. L. OLIVER.
CONTINUOUS VACUUM FILTER.
APPLICATION FILED SEPT. 8, 1908.

919,628.

Patented Apr. 27, 1909.
4 SHEETS—SHEET 4.

WITNESSES.
Arthur L. Slee
S. Constine

INVENTOR.
Edwin Letts Oliver
by Wm F. Booth
his Attorney.

UNITED STATES PATENT OFFICE.

EDWIN LETTS OLIVER, OF GRASS VALLEY, CALIFORNIA.

CONTINUOUS VACUUM-FILTER.

No. 919,628.  Specification of Letters Patent.  Patented April 27, 1909.

Application filed September 8, 1908. Serial No. 452,036.

*To all whom it may concern:*

Be it known that I, EDWIN LETTS OLIVER, a citizen of the United States, residing at Grass Valley, in the county of Nevada and State of California, have invented certain new and useful Improvements in Continuous Vacuum-Filters, of which the following is a specification.

My invention relates to that class of continuous rotary filters in which a rotating drum, partially or wholly submerged in the material to be filtered, is provided with a filtering periphery through which the liquid component of said material is drawn by "suction", and from which the clinging solid component is forced by direct air pressure.

The filter is particularly adapted for the continuous removal of water, or cyanid or other solution from ores, tailings, slime, sand, concentrates, precipitates or mixtures of the same; in which connection I shall hereinafter describe it. It is also adapted for separating any solid or insoluble material from its containing fluid, as for example, crystallized substances from the mother liquor; crystallized sugar from its syrup; wood-pulp, paper, etc., from water; mud, clay, or any solid or semi-solid or insoluble substances from water, or other liquid, for the purpose of clarification of the liquid, or for the removal of said substances.

The object of my invention is to provide an apparatus, simple in construction and operation which will continuously and automatically filter and wash any material that has to be so treated, with a minimum cost for installation, labor, power and maintenance, and a maximum efficiency and capacity.

To these ends my invention consists in the novel arrangement, construction and combination of the several parts of the apparatus hereinafter fully described.

Figure 1:
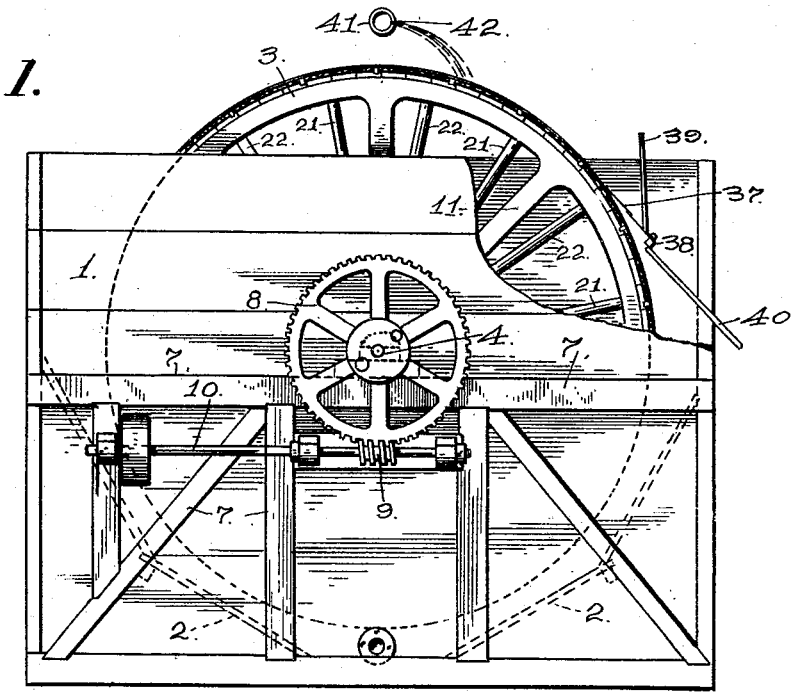
Figure 2:
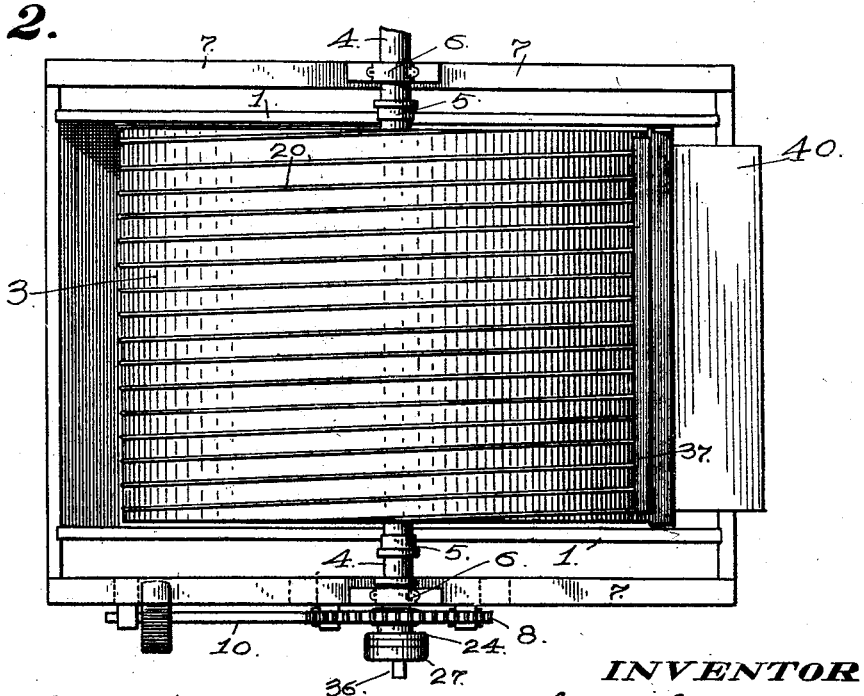
Figure 8:
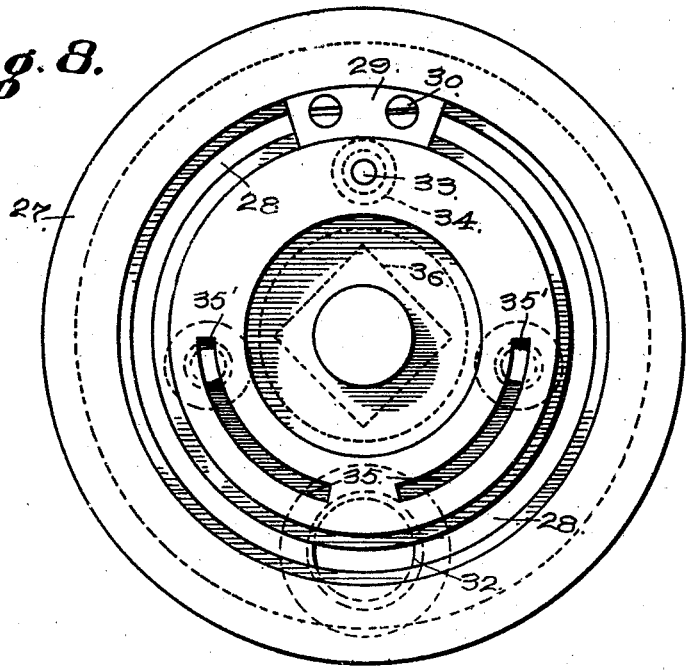

Referring to the accompanying drawings for a more complete explanation of my filter, Figure 1 is an end elevation, partly broken, of my filter. Fig. 2 is a plan of the same. Fig. 3 is a longitudinal section, broken, of the filter-drum. Fig. 4 is a detail of the fastening means for securing the periphery of the filter-drum to the drum spiders. Fig. 5 is a sectional detail, showing the construction of the filter sections of the drum, and the communication of the vacuum and pressure pipes with said sections. Fig. 6 is a section of the valve which controls the vacuum and pressure pipes. Fig. 7 is a face view of the revoluble member of said valve, the lower portion being in section. Fig. 8 is a face view of the non-rotating member of the valve of Figs. 6 and 7.

In Figs. 1 and 2, 1 is a tank or container, of any suitable construction, which may or may not be fitted with a false bottom 2, (shown in dotted lines in Fig. 1) in order to better conform it to the rotating filter-drum. In this tank is placed the mixture to be treated, which I shall hereinafter term "pulp".

3 is the filter-drum which is partially or wholly submerged in the pulp. This drum is caused to rotate by means of a shaft 4, to which it is secured, said shaft passing out through the sides of the tank in suitable stuffing boxes 5, as seen in Fig. 3, and mounted in bearings 6 on the exterior frame work 7. Rotation is imparted to the shaft 4 by any suitable means, as, for example, by the worm gear 8 upon it, and the worm 9 on the drive shaft 10, as shown in Figs. 1 and 2. The filter drum is composed, as seen in Fig. 3, of a number of spiders 11, secured on the shaft 4, and carrying an impervious periphery. This periphery is best made up of staves 12, like a tank, (Figs. 3 and 5); said staves being let into shoulders 13 in the spider rims, and securely clamped by hook-bolts 14, (Figs. 3 and 4). The impervious periphery of the drum, thus formed by these staves, is divided into any suitable number of filter-sections, by means of cleats 15, as shown in Fig. 5, let into the staves and projecting beyond their surface. These cleats lie parallel with the axis of the drum and are spaced equidistant. In each section is placed a layer of expanded metal 16, on the stave surface. Upon this expanded metal is placed a section of wire cloth 17. Upon the wire cloth is placed a section of burlap 18. These sections 16, 17 and 18 fill each filter-section to about the level of the cleats 15. Around the whole drum is wound canvas 19, and around this canvas is wound helically, from one end of the drum to the other, a wire 20 which lies upon and projects from the surface of said canvas. Figs. 5 and 2.

The shaft 4, which forms the axis of the filter drum, is a hollow shaft, as shown in Fig. 3. One of its ends is closed. Through its other end enter a number of pipes. One series of these pipes, indicated by 21, are the vacuum or "suction" pipes. There is one of these pipes for each filter-section of the drum; said pipes extending into the hollow shaft 4, and thence passing through its wall, and leading radially to and through the impervious stave-periphery of the drum, on the outer surface of which just within the expanded metal section 16, they open out, as plainly seen in Fig. 5. A second series of pipes, indicated by 22, are the "pressure" pipes. These are similar in number and course to the series 21. Where these two series of pipes enter the end of the hollow shaft 4, they are concentric, the "vacuum" series being the outer, and the "pressure" series the inner ring.

Secured to the outer end of the shaft 4, by screws 23, as seen in Fig. 6, and rotating with said shaft is a disk 24, which forms the revoluble member of the automatic valve. All the pipes 21 and 22 enter this disk and communicate with ports 25 and 26 respectively, which open through said disk, and its attached face plate 24'. A second disk 27, constituting the non-revoluble member of the valve is fitted to the face of the disk 24, and is held to seat by atmospheric pressure. In the face of a disk 27, opposite the vacuum ports 25 of the disk 24 is an annular groove-port 28, (see Fig. 8) which at one point in its course is closed up by an abutment 29, adjustably fitted therein by the bolts 30, in order to accurately define its position. All the vacuum ports 25 are in continuous communication with the groove port 28, except when each reaches the abutment 29, at which time, and for a short period, that one port 25 has no communication with said groove-port. The groove-port 28 communicates with a chamber 31, in the disk 27, (Fig. 6) with which a pipe 32 communicates. This pipe 32 leads to any suitable source of vacuum, unnecessary herein to show. "Suction" is thus maintained in all the vacuum pipes except one. Through the disk 27, is a port 33, Fig. 6, radially alined with the abutment 29 of the groove-port 28, Fig. 8. The pressure ports 26 of the disk 24 successively communicate with this port 33, and from said port, a pipe 34 leads to a suitable source of pressure, unnecessary herein to show. Thus, when the vacuum is cut off from any one filter-section, the pressure is admitted to said section. An auxiliary pressure port may be provided for emergency purposes. This consists of an elongated curved groove or grooves 35 in the face of the disk 27 (Fig. 8) which grooves communicate with the source of pressure by pipes 35', and with several of the pressure ports 26. In operation the filter sections affected by this emergency port, are those most deeply submerged in the pulp.

In order to properly adjust the non-rotating or stationary member or disk 27 of the valve, relatively to the revoluble member or disk 24, and to prevent the rotation of said disk 27, and to keep it to its seat if the vacuum is lowered or cut-off for any reason, a turnable stem 36, Fig. 6, is provided, the outer end of which is to be suitably held. This stem has its inner end square, or is otherwise suitably shaped, to fit in a socket in the back of disk 27, and prevent its rotation.

In Figs. 1 and 2, 37 is a scraper plate which rests its edge against and upon the wire wound periphery of the filter-drum, on its descending side, near the top. This scraper is hinged at 38 to the side of the tank 1, or to any convenient place, and is provided with a handle 39, to throw it into or out of action. By thus hinging the scraper, and by making it quite thin, it will follow the drum periphery closely and accurately, and allow for irregularities. With the lower end of the scraper a discharge apron 40 communicates so that the slime taken from the drum by the scraper is delivered to the apron and by it is discharged clear of the tank 1. Above the top of the filter drum, in advance of the scraper, is a pipe or box 41, provided with exits 42. Water, or a wash solution of any desired composition is supplied to this box and by it discharged upon the slime adhering to the filter. This wash solution is drawn into the slime by the "suction", thus replacing any of the original solution which may be left. The abutment 29 of the annular groove-port 28 of the valve disk 27, is so placed as to cut off the vacuum from that filter-section of the drum which is about to pass the scraper 37, and the pressure port 33 of said disk, is so placed that it affects said particular filter section, so that at this point, the suction is cut off while the pressure is applied to loosen and force the slime outwardly so that the scraper can remove it.

The operation of the apparatus may now be described. For illustration I shall describe it in connection with material termed "slime" in cyanid parlance. The tank 1 being filled with pulp, that is, a mixture of slime and cyanid solution or water, to within a few inches of bottom of the scraper 37, the filter drum 3 is slowly revolved. A coating of slime adheres to the filter surface of the drum, under the combined action of gravity, due to the submergence of drum and weight of slime, and the artificial vacuum. Properly speaking, the vacuum pump reduces the pressure of the air in the pipes and filter sections, and the weight of the atmosphere causes the slime to adhere to the filter, and causes the solution to pass through the pipes; but, for convenience, I speak of a vacuum as drawing the solution through the pipes, that being the common way of speaking. The slime adheres to the filter surface, while the solution passes through into the pipes and valve and to any convenient receptacle or pump. The coating of slime is partially dried as it emerges from the pulp in the tank, both by reason of the solution being drawn out by vacuum and by the air being drawn through. As the coating of slime passes under the wash box or pipe 41, a quantity of wash solution is drawn into the slime, sufficient to remove any soluble gold or solution. Just as the edge of a filter section of the drum reaches the upper edge of the scraper 40, the vacuum is shut off by the abutment 29 of the valve disk 27, and a small amount of compressed air is blown through the said section, by the opening of the pressure port 33. This pressure of air is maintained while the filter section is passing the scraper and is shut off just as the upper edge of said section reaches said scraper, being then turned into next filter section as it reaches the scraper. The vacuum is turned on to the filter section below the scraper as soon as the pressure of air is shut off. The action of the air is to lift the coating of slime slightly from the filter so that the slime will slide off over the scraper instead of passing down into the pulp again. It also effectually clears the interstices of the filter body and leaves it free to act on a fresh supply of slime.

With some classes of slime, or other material not very impermeable or sticky, it is not necessary to use the air pressure, the slime being mechanically removed by the scraper. With material not very impermeable, and containing a relatively large amount of solution to slime, an artificial vacuum is not necessary, the filters having considerable capacity due to their submergence and because of vacuum caused by the flow of solution through the pipes. Pressure of air increases the capacity by keeping the pores of the filter body clear. With wood pulp and material of like nature, a continuous sheet of partially dried pulp can be removed from the filter drum.

The wire winding of the filtering body on the surface of the drum, holds said body well in place, protects it from the scraper, for which it furnishes a guide, and by being wound helically gives an even wear to the scraper edge, instead of wearing it into grooves as it would if the wire were wound in parallel bands.

It is obvious that the ports in the non-rotatable member or disk of the valve may be so modified in size as to control more than one filter-section, either for vacuum or for pressure, as may be desired.

Having thus described my invention, what I claim as new and desire to secure by Letters Patent is:—

1. A filter of the described class, comprising a tank; a rotatable drum mounted therein, said drum having its periphery divided into an annular series of filter-sections; a hollow axle by which said drum is carried; two series of pipes leading into said hollow axle from one end and passing out through its wall, radially to and communicating with the filter-sections, the inleading ends of one series of pipes being in communication with a means for producing a vacuum, and the inleading ends of the other series of pipes being in communication with a source of compressed air-pressure; and an automatically operated valve in connection with said inleading pipe ends for controlling the pressure in both series of pipes.

2. A filter of the described class, comprising a tank; a rotatable drum mounted therein, said drum having its periphery divided into an annular series of filter-sections; a hollow axle by which said drum is carried; two series of pipes leading into said hollow axle from one end and passing out through its wall, radially to and communicating with the filter-sections, the inleading ends of one series of pipes being in communication with a means for producing a vacuum, and the inleading ends of the other series of pipes being in communication with a source of compressed air-pressure; and an automatically operated valve in connection with said inleading pipe ends for periodically effecting air-pressure in some of the pipes of each series and preventing it in others.

3. A filter of the described class, comprising a tank; a rotatable drum mounted therein, said drum having its periphery divided into an annular series of filter-sections; a scraper acting upon the periphery of said drum to remove the solid matter therefrom; two series of pipes, one pipe of each series communicating at one end with each filter section, the other end of one series communicating with a means for producing a vacuum, and the other end of the second series communicating with a source of compressed air-pressure; and an automatically operated valve controlling said pipes to cut off the vacuum pressure and admit the compressed-air-pressure to those pipes the filter section of which is passing the scraper.

4. A filter of the described class, comprising a tank; a rotatable drum mounted therein, said drum having its periphery divided into an annular series of filter-sections; a scraper acting upon the periphery of said drum to remove the solid matter therefrom; a hollow axle upon which the drum is carried; two series of pipes leading into said hollow axle from one end and passing out through its wall, radially to and communicating with said filter sections, one pipe of each series for each filter section, the inleading ends of one series of pipes communicating with a means for producing a vacuum, and the inleading ends of the other series of pipes communicating with a source of compressed-air-pressure; and an automatically operated valve controlling said pipes to cut off the vacuum-pressure and admit the compressed-air-pressure to those pipes the filter section of which is passing the scraper.

5. In a filter of the described class, the combination of a tank; a rotatable drum therein, having an impervious periphery divided into an annular series of sections by spaced cleats, secured to and projecting beyond the surface of the periphery; filtering material secured to the periphery between the cleats; a wrapping of wire about said series of filter-filled sections projecting from the face thereof; a scraper resting on said wire wrapping; a series of pipes entering the drum parallel with its axis and thence extending radially to and opening through the impervious periphery under the filtering material in each section, said pipes communicating with a source of air-pressure; and an automatically operating valve for controlling said air-pressure.

6. In a filter of the described class, the combination of a tank; a rotatable drum therein, having an impervious periphery divided into an annular series of sections by spaced cleats, secured to and projecting beyond the surface of the periphery; filtering material secured to the periphery between the cleats; a wrapping of wire helically directed about said series of filter-filled sections projecting from the face thereof; a scraper resting on said wire wrapping; a series of pipes entering the drum parallel with its axis and thence extending radially to and opening through the impervious periphery under the filtering material in each section, said pipes communicating with a source of air-pressure; and an automatically operating valve for controlling said air-pressure.

7. In a filter of the described class, the combination of a tank; a rotatable drum therein, having an impervious periphery provided with filtering material divided into a series of annular sections and wrapped with wire which projects from the face thereof; a scraper resting on said wire wrapping; a series of pipes entering the drum parallel with its axis and thence extending radially to and opening through the impervious periphery under the filtering material in each section, said pipes communicating with a source of air-pressure; and an automatically operating valve for controlling said air-pressure.

8. In a filter of the described class, a rotating drum having an impervious periphery provided with an annular series of filter-sections composed of expanded metal, wire cloth and fabric substantially as described, said series of sections being helically wrapped with wire which projects from the face thereof; and a scraper resting on said wire wrapping.

9. A filter of the described class, comprising a tank; a rotatable drum mounted therein and provided on its periphery with an annular series of filter sections; a hollow axle by which said drum is carried; two series of pipes leading into said hollow axle from one end and passing out through its wall, radially to and communicating with the filter-sections; a disk secured upon one end of the hollow axle and receiving the ends of both series of pipes, said disk having ports through it communicating with said pipe ends; a second non-rotary disk fitted to the face of the first disk, said non-rotating disk having in its face a curved groove-port of a length to register simultaneously with less than the whole number of ports in the first disk which communicate with one series of pipes, and a separate port to register with the ports of the first disk which communicate with the other series of pipes; a connection from said separate port to a source of compressed air-pressure; and a connection from said curved groove-port to a means for producing a vacuum.

In testimony whereof I have signed my name to this specification in the presence of two subscribing witnesses.

EDWIN LETTS OLIVER.

Witnesses:
  WM. F. BOOTH,
  D. B. RICHARDS.